United States Patent [19]

Metal

[11] Patent Number: 5,552,791
[45] Date of Patent: Sep. 3, 1996

[54] FIBER OPTIC TELEMETRY ARRAY CALIBRATION SYSTEM

[75] Inventor: Israel Metal, Kew Garden Hills, N.Y.

[73] Assignee: Northrop Grumman Corporation, Los Angeles, Calif.

[21] Appl. No.: 418,313

[22] Filed: Apr. 7, 1995

[51] Int. Cl.$^6$ ........................................ G01S 7/40
[52] U.S. Cl. ............................ 342/174; 342/377
[58] Field of Search .................... 342/174, 371, 342/372, 375, 377

[56] References Cited

U.S. PATENT DOCUMENTS

| | | | |
|---|---|---|---|
| 5,117,239 | 5/1992 | Riza | 342/375 |
| 5,307,073 | 4/1994 | Riza | 342/372 |
| 5,374,935 | 12/1994 | Forrest | 342/368 |
| 5,461,389 | 10/1995 | Dean | 342/375 |

OTHER PUBLICATIONS

Hans Steyskal and John F. Rose, Digital Beamforming for Radar Systems, Microwave Journal, Jan., 1989 at 121–123, 125, 128–132, 134–135, 136.

*Primary Examiner*—John B. Sotomayor

[57] ABSTRACT

An apparatus and method for calibrating a plurality of sensors having a predetermined spatial distribution. The method according to the invention herein can include the steps of transmitting a first calibration signal in a first direction through a transmission medium to at least one of the sensors; receiving from the sensor a first portion of the first calibration signal through the transmission medium; determining at least one first calibration signal parameter from the first calibration signal and the first portion according to a first predetermined method; transmitting a second calibration signal in a second direction through the transmission medium to the sensor; receiving from the sensor a second portion of the second calibration signal through the transmission medium; determining at least one second calibration signal parameter from the second calibration signal and the second portion according to a second predetermined method; and determining at least one calibration parameter from the first calibration signal parameter and the second calibration signal according to a third predetermined method. The first predetermined method can include determining a first transfer ratio of the first calibration signal to the first portion; the second predetermined method can include determining a second transfer ratio of the second calibration signal to the second portion; the third predetermined method can include determining a product of the second transfer ratio and the first transfer ratio; and the fourth predetermined method can include determining a transfer ratio of the reference calibration parameter and a test calibration parameter.

16 Claims, 2 Drawing Sheets

FIBER OPTIC TELEMETRY ARRAY CALIBRATION SYSTEM

BACKGROUND OF THE INVENTION

1. Field of the Invention

This invention relates to calibration apparatus, in particular, calibration apparatus for sensor arrays, and more particularly, calibration apparatus for sensor arrays employing optical fiber cable telemetry links.

2. Description of the Prior Art

In applications such as beamforming, it is important to know the phase relationships between the elements in a sensor array. If the array has fiberoptic telemetry links that are distributed over large distances and subject to a variety of stress and thermal conditions, the length of any given fiber can be difficult to predict, thus degrading the phase accuracy of the beamformer. The degradation can be enough to impair adaptive beamforming and nulling.

The amplitude and phase response of each array element will vary with optical losses in the laser-to-detector path due to such factors as, for example, microbending, temperature variations, changes in the filter/gain network response with temperature and aging, stress- and thermally-induced changes in the optical path length, and the like.

Traditionally, there are two ways to calibrate a sensor array. First, a calibration beam may be directed to the sensors in the array. The direction of arrival, frequency, and signal-to-noise ratio of the calibration beam are usually well-characterized, permitting array calibration to within desired tolerances. This method, however, may not be used during normal array operation and, as operating conditions change, calibration data such as fiber length can become stale and inaccurate.

Second, a calibration signal can be transmitted to and redirected from calibration signal detectors in the sensor array. Where the calibration signal, and its return, travel along optical fibers, the phase of the calibration signal can be severely degraded due to thermal effects upon the optical fiber. For example, a typical radar sensor system can have hundreds, or even thousands, of feet of optical fiber cable. A temperature change of, say, 10° F. or 20° F. from some reference temperature can cause the optical fiber cable to vary several inches, or much more, from a corresponding reference length. Such variation can create a substantial phase error in the calibration signal.

In a single pulse, single path calibration system, where the calibration signal is transmitted in only one direction with respect the spatial distribution of the sensors, the actual length of the optical fibers going to each sensor may be unknown due to changing thermal conditions and construction errors. Without this knowledge or a means to compensate therefor, the phase of the calibration signal is essentially uncontrolled. In this situation, a calibration system becomes subject to the same variations as the rest of the sensor system, with attendant adverse effects on system calibration.

Construction errors can arise from situations where optical fiber cables with putatively identical lengths actually differ by several inches, or more, further adding to input signal and calibration signal phase errors. Typically, these construction errors cannot be calibrated out because changing operating conditions can confound calibrations for this factor. As a result, it becomes difficult to compensate for sensor-to-sensor variations in properties of the respective filter/gain networks which can introduce additional phase and amplitude errors.

An array with a self-calibrating system that monitors the receive channels for subsequent digital correction of channel imbalances was described in Hans Steyskal and John F. Rose, *Digital Beamforming for Radar Systems*, MICROWAVE JOURNAL, January 1989, at 132, 134–36. This system employed a bidirectional loop which provided the calibration source with two signal paths to each elemental receiver for a radio-frequency (RF) calibration signal.

Calibration of an elemental receiver was achieved by two separate measurements of its output signal, with the RF test signal fed through either direction of the loop feed, thereby deriving channel transfer coefficient values that can be independent both of the location of the calibration test port and of the phase shift and attenuation through the feed loop. This system is directed to the use of the calibration system for RF pilot tone distribution in radar applications. In addition, the authors indicate that accurate amplitude and phase references at each element are needed to satisfy the precision requirements of some array systems, and allude to optical fiber technology as the technique of choice for a calibration network.

What is needed, therefore, is a calibration system for a sensor array that can compensate for phase errors such as those imposed by stress- and thermally-induced changes in the lengths of optical fiber connectors between sensors in the array and the sensor signal processor.

SUMMARY OF THE INVENTION

The invention herein provides for an apparatus and method for calibrating a plurality of sensors having a predetermined spatial distribution. The apparatus can include a calibration signal generator for providing a calibration signal to the sensors using an optical transmission medium; a calibration signal detector for detecting the calibration signal at each of the sensors, and for producing a calibration output; a calibration signal processor for determining at least one calibration parameter from the calibration output; and a switch, interposed between the signal generator and the signal detector, for selectably transmitting the calibration signal through the transmission medium in a first direction and a second direction relative to the spatial distribution of the sensors. The calibration signal can be an optical calibration signal.

The calibration signal generator can include a calibration switch operably connected to each of the sensors and to the signal detector, for switching said detector between a calibration mode and a sensor mode. It can also include a signal source for providing a carrier signal, which can be an optical signal, a baseband signal generator for providing a calibration baseband signal, which may be a radio-frequency signal, and a modulator connected to the signal source and the baseband signal generator for modulating said calibration baseband signal onto the carrier signal and providing the calibration signal thereby. The modulator can be an electro-optic modulator thus producing an optical calibration signal.

The signal detector can include a converter, which can be a photovoltaic converter, for converting the portion of the calibration signal to the calibration output, and a signal splitter, which can be an optical splitter, for selectably passing the portion of the calibration signal from the transmission medium to the converter.

The method according to the invention herein can include the steps of transmitting a first calibration signal in a first direction through an optical transmission medium to at least one of the sensors; receiving from the sensor a first portion of the first calibration signal through the transmission medium; determining at least one first calibration signal parameter from the first calibration signal and the first portion according to a first predetermined method; transmitting a second calibration signal in a second direction through the transmission medium to the sensor; receiving from the sensor a second portion of the second calibration signal through the transmission medium; determining at least one second calibration signal parameter from the second calibration signal and the second portion according to a second predetermined method; and determining at least one calibration parameter from the first calibration signal parameter and the second calibration signal according to a third predetermined method.

The first calibration signal parameter can include phase, or amplitude, or the time for the first calibration signal to traverse the transmission medium in the first direction, or a combination thereof. Similarly, the second calibration signal parameter can include phase, or amplitude, or the time for the second calibration signal to traverse the transmission medium in the second direction, or a combination thereof.

Where an array of sensors is to be calibrated, it can be preferred to designate one sensor as a reference sensor and the rest of the sensors as test sensors. The calibration parameter determined for the reference sensor can be designated as the reference calibration parameter.

The method according to the invention herein can further include performing the aforementioned method steps for the test sensors, producing a test calibration parameter for each test sensor so calibrated, and determining at least one array calibration parameter from the reference calibration parameter and the test calibration parameter, according to a fourth predetermined method.

The first predetermined method discussed above can include the step of determining a first transfer ratio of the first calibration signal to the first portion. Similarly, the second predetermined method can include the step of determining a second transfer ratio of the second calibration signal to the second portion. The third predetermined method can include the step of determining a product of the second transfer ratio and the first transfer ratio. Also, the fourth predetermined method can include the step of determining a transfer ratio of the reference calibration parameter and a test calibration parameter.

Other details, objects, and advantages of the invention will become apparent as the following description of certain present preferred embodiments thereof proceeds. The accompanying drawings show presently preferred embodiments of the invention.

DETAILED DESCRIPTION OF THE PREFERRED EMBODIMENTS

Figure 1:
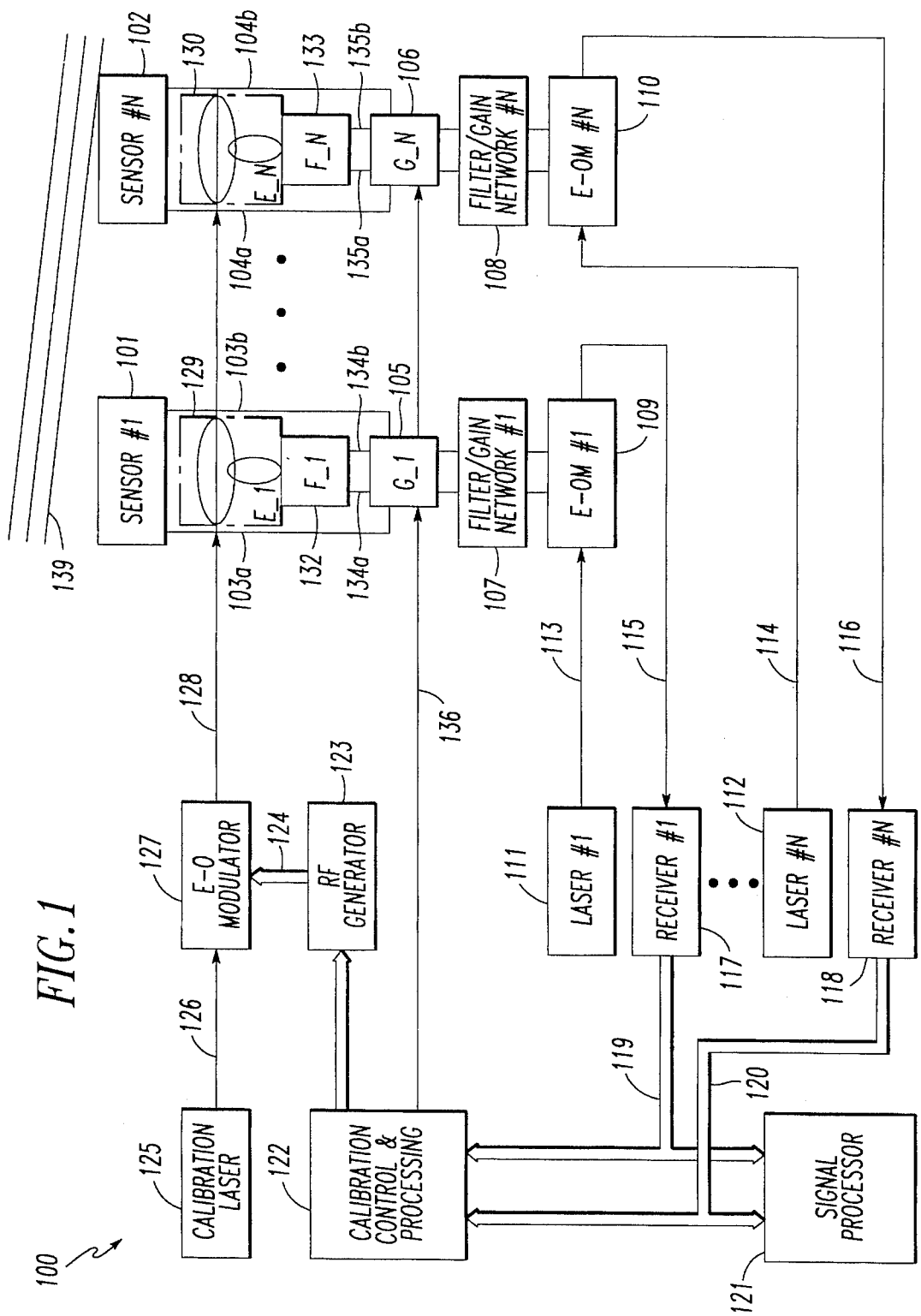
FIG. 1 is an illustration of a telemetry array having optical fiber cable connectors, employing a single pulse, single path calibration system.

FIG. 1 illustrates a fiberoptic telemetry array 100 having a single pulse, single path calibration system. During normal operations, sensors 101, 102 can receive incoming signal wavefront 139. Sensors 101, 102 can be two sensors of an array having N sensors, wherein N is a preselected number greater than, or equal to, two. When signal wavefront 139 is sensed by sensors 101, 102, wavefront 139 can be converted into electrical signals 103a, 103b and 104a, 104b and transmitted to calibration switches 105, 106. Signal wavefront 139, as detected, can vary at respective sensors 101, 102 by both amplitude and phase.

During operations in the sensor mode, signals 103a, 103b, 104a and 104b are received into switches 105, 106, passed to respective filter/gain networks 107, 108 for frequency, phase and amplitude shaping. Lasers 111, 112 provide generally unmodulated optical signals on modulator input fibers 113, 114 to electro-optic modulators 109, 110, respectively. Modulators 109, 110 can modulate the optical signals from lasers 111, 112, using the output from networks 107, 108, thus producing data-modulated optical signals on modulator output fibers 115, 116 which signals are representative of signal wavefront 139.

The modulated signals on output fibers 115, 116 can be detected by receivers 117, 118 which convert modulated optical signals on fibers 115, 116 into electrical signals 119, 120, respectively. These modulated optical signals can have time delays (phase shifts) and power losses associated with fibers 115, 116, therein. Under normal operating conditions, signals 119 and 120 are received by signal processor 121 such that the information of interest in signal wavefront 139 can be extracted therefrom. Fibers 113, 114, 115, and 116 are preferred to be optical fiber cables, which can be affected by environmental, particularly stress and thermal, conditions.

When it is desired to perform calibration on system 100, calibration control and processing unit 122 can induce RF generator 123 to provide a RF calibration signal 124 of the desired bandwidth. Calibration laser 125 can transmit a generally unmodulated calibration optical carrier waveform on output fiber 126. Signal 124 can be modulated onto the carrier waveform by modulator 127. The modulated calibration signal on fiber 128 is transmitted to the sensor array, including sensors 101, 102. Optical signal splitters 129, 130 can direct a portion of the optical signal on fiber 128 to photovoltaic converters 132, 133, where the optical signal is converted into respective electrical calibration signals 134a, 134b and 135a, 135b. Fiber 128, and thus the optical signal, usually is terminated at Nth sensor 130.

In the calibration mode, unit 122 sends optical control signal 136 to each of calibration switches 105, 106 wherein signals 103a, 103b, and 104a, 104b are blocked and are replaced by calibration signals 134a, 134b and 135a, 135b, respectively. Switches 105, 106 divert calibration signals 134a, 134b, and 135a, 135b into filter gain networks 107, 108, respectively, for characterization of the filtering, waveform shaping, optical path length, power loss, and the like, performed therein.

Lasers 111, 112 can produce essentially unmodulated optical signals on fibers 113, 114. As during normal operations, modulators 109, 110 can modulate the optical signals from lasers 111, 112, using the output signals from networks 107, 108, thus producing data-modulated signals on modulator output fibers 115, 116. However, in the calibration mode, the signals on fibers 115, 116 are representative of the calibration signal on fiber 128. The signals on fibers 115, 116 can be received by receivers 117, 118 such that receiver electrical output signals 119, 120, respectively, are produced thereby.

In a single pulse, single path calibration system, calibration is performed by using the complex ratio of the measured return from each sensor 101, 102 compared to one sensor chosen as the reference sensor. The amplitude calibration accuracy depends on accurate knowledge of amplitude losses due, for example, to microbending of the optical fiber cable, in cable sections connecting all of the calibration channels. In addition, phase calibration requires precise knowledge of the calibration optical fiber lengths between each pair of channels.

In the calibration mode, signals 119, 120 can be diverted to calibration control and processing unit 122 to produce at least one calibration parameter thereby. Unit 122 can communicate the calibration parameters to signal processor 121, as needed, for incorporation into the signal processing of signal wavefront 139.

Because fibers 128 is an optical fiber cable, environmental thermal and stress changes can induce large variations in the length of the fiberoptic cable segments, which variations may be unknown, leading to substantial phase errors in the calibration signals to photovoltaic converters 132, 133. These phase errors can seriously degrade beamforming and nulling performance and, largely, cannot be qualified or compensated for by the single pulse, single path calibration system shown in FIG. 1.

A dual pulse, reciprocal path calibration system according to the invention herein can provide a way to compensate for changes in the length of the fiberoptic calibration cable so that the calibration signals can be independent of uncontrollable amplitude and phase variations, and the attendant signal amplitude and phase errors, in the calibration link. One embodiment of the dual pulse, reciprocal path calibration apparatus according to the invention herein can include a calibration signal generator for generating a calibration signal in an optical transmission medium, a calibration signal detector, a calibration signal processor, and a switch for selectably transmitting the calibration signal in at least one of a first direction and a second direction.

Figure 2:
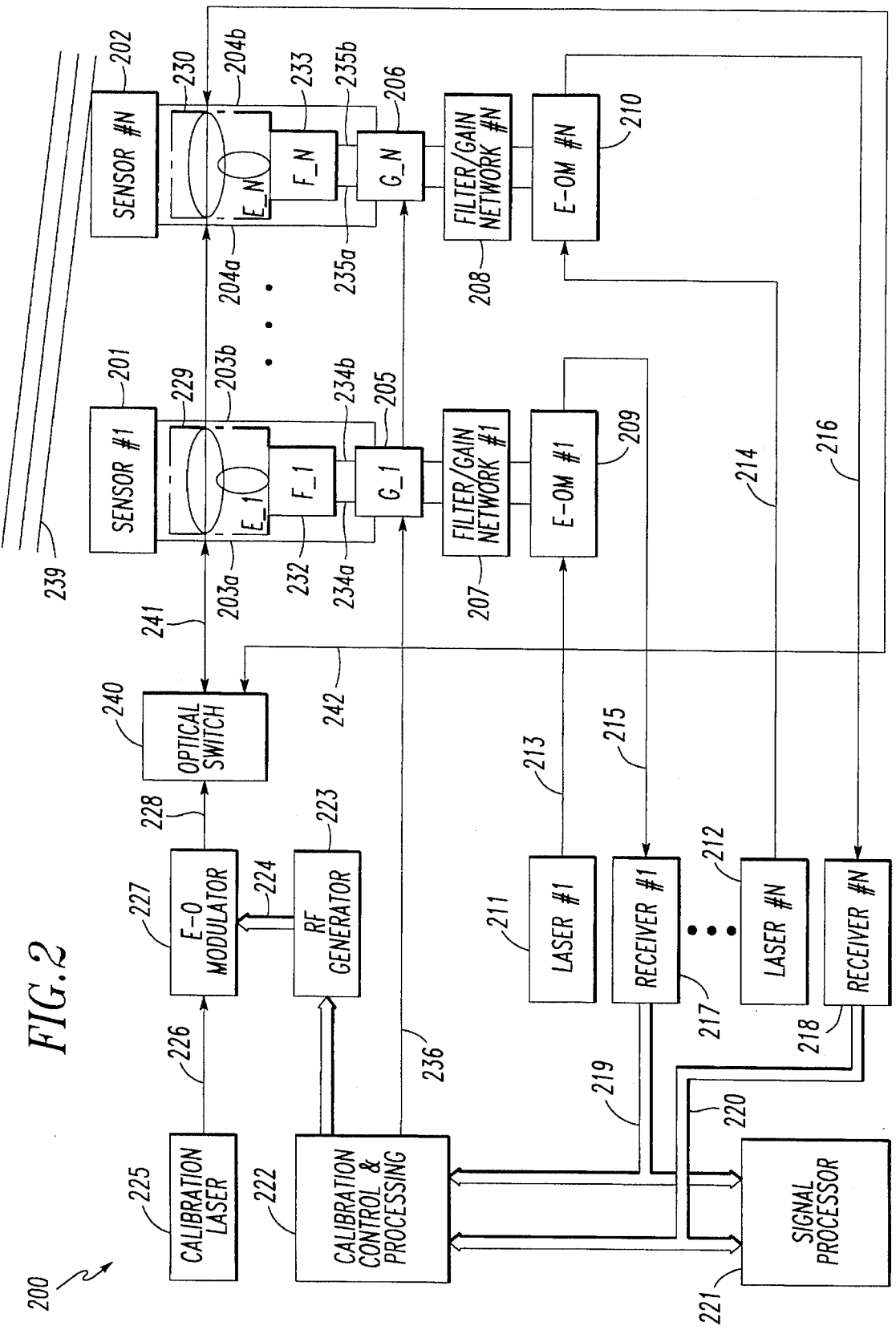
FIG. 2 is an illustration of a telemetry array having optical fiber cable connectors, employing a dual pulse, reciprocal path calibration system according to the invention herein.

In the context of FIG. 2, the calibration signal generator can include calibration laser 225, E-O modulator 227, generator 223, and calibration and control processing unit 222. Generator 223 may provide a calibration baseband signal of the frequency and bandwidth of choice including acoustic, RF, and other frequencies, depending upon the nature of sensors 201, 202. The modulated optical calibration signals can be detected by the calibration signal detector which can include optical splitters 229, 230, photovoltaic converters 232, 233, filter/gain networks 207, 208, electro-optic modulators 209 (E-OM #1), 210 (E-OM #N), lasers 211, 212, and receivers 217, 218. The calibration signal processor can include unit 222, and may include signal processor 221. Optical switch 240 can direct the calibration signal in at least one of a first direction and a second direction.

In telemetry array 200, sensors 201, 202 are aligned in a predetermined spatial distribution. During normal operations in the sensor mode, sensors 201, 202 can receive incoming signal wavefront 239. Sensors 201, 202 can be two sensors of an array having N sensors, wherein N is a preselected number greater than, or equal to, two. Sensors 201, 202 can be selected to detect a frequency range of interest such frequency ranges as, for example, radio frequency including radar, and acoustic including sonar. Wavefront 239 can be converted into electrical signals 203a, 203b and 204a, 204b when detected by sensors 201, 202 and transmitted to calibration switches 205 (G_1), 206 (G_N). Signal wavefront 239, as detected, can vary at respective sensors 201, 202 by both amplitude and phase.

Similar to the array in FIG. 1, during normal operations, signals 203a, 203b, and 204a, 204b are received into switches 205, 206, and passed to respective filter/gain networks 207, 208, respectively, for frequency, phase, and amplitude shaping. Lasers 211, 212 provide generally unmodulated optical signals 213, 214 to electro-optic modulators 209, 210. Modulators 209, 210 can modulate the output from networks 207, 208 onto the optical signals from lasers 211, 212, thus producing data-modulated signals on modulator output fibers 215, 216, which signals are representative of signal wavefront 239. The modulated signals on fibers 215, 216 can be detected by receivers 217, 218 which convert modulated optical signals on fibers 215, 216 into electrical signals 219, 220, respectively. Under normal operating conditions, signals 219 and 220 are received by signal processor 221 such that the information of interest in signal wavefront 239 can be extracted therefrom.

When it is desired to perform calibration on system 200, calibration laser 225 can transmit a generally unmodulated calibration carrier signal on output fiber 226. Calibration control and processing unit 222 can induce RF generator 223 to provide a baseband calibration signal 224, which can be an RF signal, of the desired bandwidth. It is preferred that the frequency and bandwidth of the calibration signal be approximately the same as the type of signal to be sensed by sensors 201, 202. Signal 224 then can be modulated onto the carrier signal by modulator 227, for example, by amplitude modulation.

The modulated calibration signal on fiber 228 is transmitted to optical switch 240 which, in turn, transmits the modulated optical calibration signal in a first direction on optical fiber 241 such that first sensor 201 receives the optical calibration signal first and Nth sensor 202 receives the optical calibration signal last. Switch 240 also may selectably transmit the modulated optical calibration signal in a second direction on optical fiber 242 such that Nth sensor 202 receives the optical calibration signal first and first sensor 201 receives the optical calibration signal last. Each of the first and second directions are respective of the aforementioned predetermined spatial distribution of sensors 201, 202 in array 200. The advantages of the dual pulse, reciprocal path calibration signal flow will be discussed below.

Optical signal splitters 229 (E_1), 230 (E_N) can direct a portion of the optical signal on fibers 241 or 242 to photovoltaic converters 232 (F_1), 233 (F_N), where the optical signal is converted into respective electrical signals 234a, 234b and 235a, 235b. Optical signal splitters 229, 230 can be constructed to divert a predetermined portion of the calibration signal to converters 232, 233. Unlike the single pulse, single path calibration apparatus, the optical signal on fiber 228 does not terminate at Nth sensor 230, and optical fibers 241, 242 can be united.

In the calibration mode, unit 222 sends control signal 236 to each of calibration switches 205, 206 wherein signals 203a, 203b, and 204a, 204b from sensors 201, 202 are blocked and are replaced by calibration signals 234a, 234b and 235a, 235b, respectively. Switches 205, 206 instead divert calibration signals 234a, 234b, 235a, 235b into filter gain networks 207, 208, respectively, for characterization of the filtering, waveform-shaping, time delays, power losses, and the like, performed therein. Lasers 211, 212 can produce essentially unmodulated optical signals on fibers 213, 214. The signals on fibers 215, 216 can be received by receivers 217, 218 such that receiver electrical output signals 219, 220, respectively, are produced thereby.

In the calibration mode, signals 219, 220 can be diverted to calibration control and processing unit 222 to produce at least one calibration parameter thereby. Unit 222 can communicate the calibration parameter to signal processor 221, if desired, for incorporation into the signal processing of signal wavefront 239. Signals 219, 220 can also be received directly by signal processor 221 for calibration purposes.

As during normal operations in the sensor mode, modulators 209, 210 can modulate the output from networks 207, 208 onto the optical signals from lasers 211, 212, thus producing data-modulated signals on modulator output fibers 215, 216. However, in the calibration mode, the signals on fibers 115, 116 are representative of the calibration signal on either fiber 241 or 242, depending upon the selected direction-of-calibration.

Because fibers 228, 241, 242 213, 214, 215 and 216 are optical fiber cables, environmental thermal and stress changes can induce large variations in fiberoptic cable length. Because these variations may be unknown, they may lead to substantial phase error which can seriously degrade beamforming and nulling performance. However, unlike the calibration apparatus in FIG. 1, the dual pulse, reciprocal path calibration apparatus of FIG. 2 can compensate for these variations.

The state of sensor array 200 can be characterized by propagating a signal in the first (or second) direction through fiber 241 (242), and then in the second (or first) direction through fiber 242 (241). In general, phase and amplitude errors can be induced by intersensor optical fiber variations, variations among filter/gain networks 207, 208 and variations in output fibers 115, 116 from modulators 109, 110.

Calibration performed by the dual pulse, reciprocal path apparatus can use the complex ratio of the product of the measured return from a calibration pulse transmitted in the paths of a first direction and then a second direction, for each sensor channel, to compute the selected calibration parameters. After variations arising from calibration fibers have thus been canceled, remaining errors can then be ascribed to variations due to networks 207, 208, and fibers 215, 216, for which at least one calibration parameter can be determined, which parameter may be a global calibration parameter.

Because the calibration signal light to each sensor channel will now traverse the same total path, the ratio of the transfer function product for a given sensor channel to the transfer function for the chosen reference sensor channel can be independent of amplitude losses and phase errors due to length uncertainties. Therefore, calibration of individual sensors 201, 202 can be effected by selecting one reference sensor, typically a sensor at the end of sensor array 200, or at the middle, where array 200 consists of an odd number of sensors, and adjusting the performance of array 200 on the basis of the aforementioned calibration parameter.

The method for calibrating a plurality of sensors having a predetermined spatial distribution described herein thus can include transmitting a first calibration signal in a first direction through an optical transmission medium to at least one of the sensors, and receiving a first portion of the first calibration signal through that transmission medium. After the first calibration signal is received, at least one first calibration signal parameter can be determined from the first calibration signal and the first portion according to a first predetermined method which can include determining a first transfer ratio of said first calibration signal to said first portion.

The method described herein further includes transmitting a second calibration signal in a second direction through the transmission medium to the sensor, receiving a second portion of the second calibration signal from the sensor through the transmission medium, and determining at least one second calibration signal parameter from the second calibration signal and the second portion according to a second predetermined method, which can include determining a second transfer ratio of the second calibration signal to the second portion.

At least one calibration parameter can be determined from the first calibration signal parameter and the second calibration signal according to a third predetermined method, which can include determining a product of the second transfer ratio and the first transfer ratio. The first and second calibration signal parameters can include phase, amplitude, or optical path length signal traversal time through the respective paths through the transmission medium.

In an array of sensors, one sensor can be a reference sensor, the other sensors can be test sensors and the calibration parameter thereof, obtained as described above, can be the reference calibration parameter. Calibration parameters can be determined for each of the test sensors, so that at least one array calibration parameter can be obtained from the reference calibration parameter and at least one test calibration parameter according to a fourth predetermined method, which can include determining a transfer ratio of the reference calibration parameter to the at least one test calibration parameter.

While specific embodiments of practicing the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims, and any and all embodiments thereof.

I claim:

1. An apparatus for calibrating a plurality of sensors having a predetermined spatial distribution, comprising:
   (a) a calibration signal generator, operably connected to each of said plurality of sensors, for providing a calibration signal thereto using an optical transmission medium, said calibration signal generator having a signal source for providing a carrier signal, a baseband signal generator for providing a calibration baseband signal, and a modulator connected to said signal source and said baseband signal generator for modulating said calibration baseband signal onto said carrier signal and providing said calibration signal thereby;
   (b) a calibration signal detector connected to each of said plurality of sensors for detecting said calibration signal, said detector having a converter for converting said at least a portion of said calibration signal to said calibration output, and a splitter connected to said transmission medium for selectably passing said at least a portion of said calibration signal from said transmission medium to said converter;
   (c) a calibration signal processor connected to said signal detector for determining at least one calibration parameter from said calibration output; and
   (d) a switch for selectably transmitting said calibration signal through said transmission medium in a first direction and a second direction, said switch being interposed between said signal generator and said signal detector, said first and second directions being respective of said predetermined spatial distribution.

2. An apparatus for calibrating a plurality of sensors having a predetermined spatial distribution, comprising:

(a) a calibration signal generator operably connected to each of said plurality of sensors, for providing a calibration signal thereto using a transmission medium, said transmission medium is an optical fiber medium, and said calibration signal is an optical calibration signal, said signal generator having an optical carrier signal source for providing an optical carrier signal, a radio-frequency baseband signal generator for providing a calibration baseband signal, an electro-optic modulator connected to said optical carrier signal source and said radio-frequency baseband signal generator for modulating said calibration baseband signal onto said optical carrier signal and providing said optical calibration signal thereby;

(b) a calibration signal detector connected to each of said plurality of sensors for detecting said calibration signal, said detector producing a calibration output, said signal detector having a photovoltaic converter for converting at least a portion of said calibration signal from said optical calibration signal to said calibration output, and an optical splitter connected to said transmission medium for selectably passing said at least a portion of said calibration signal to said photovoltaic converter;

(c) a calibration signal processor connected to said signal detector for determining at least one calibration parameter from said calibration output; and (d) an optical switch for selectably transmitting said optical calibration signal through said optical fiber medium in a first direction and a second direction, said switch being interposed between said signal generator and said signal detector, said first and second directions being respective of said predetermined spatial distribution.

3. The apparatus of claim 1 wherein said calibration signal generator further comprises a calibration switch operably connected to each of said plurality of sensors and said signal detector, said calibration switch for switching said detector between a calibration mode and a sensor mode.

4. The apparatus of claim 2 wherein said calibration signal generator further comprises a calibration switch operably connected to each of said plurality of sensors and said signal detector, said calibration switch for switching said detector between a calibration mode and a sensor mode.

5. A method for calibrating a plurality of sensors having a predetermined spatial distribution, comprising the steps of:

(a) transmitting a first calibration signal in a first direction through an optical transmission medium to at least one sensor of said plurality of sensors;

(b) receiving from said at least one sensor a first portion of said first calibration signal through said transmission medium;

(c) determining at least one first calibration signal parameter from said first calibration signal and said first portion according to a first predetermined method;

(d) transmitting a second calibration signal in a second direction through said transmission medium to said at least one sensor;

(e) receiving from said at least one sensor a second portion of said second calibration signal through said transmission medium;

(f) determining at least one second calibration signal parameter from said second calibration signal and said second portion according to a second predetermined method;

(g) determining at least one calibration parameter from said at least one first calibration signal parameter and said second calibration signal according to a third predetermined method.

6. The method of claim 5 wherein said at least one first calibration signal parameter includes at least one of phase and amplitude and time for said first calibration signal to traverse said transmission medium in said first direction.

7. The method of claim 5 wherein said at least one second calibration signal parameter includes at least one of phase and amplitude and time for said second calibration signal to traverse said transmission medium in said second direction.

8. The method of claim 6 wherein said at least one second calibration signal parameter includes at least one of phase and amplitude and time for said second calibration signal to traverse said transmission medium in said second direction.

9. The method of claim 5 wherein said at least one sensor is a reference sensor, said at least one calibration parameter is at least one reference calibration parameter, others of said plurality of sensors are test sensors, and wherein said method further comprises:

(h) performing steps (a) through (g) of claim 5 for each of said test sensors, producing at least one test calibration parameter for each of said test sensors thereby; and (i) determining at least one array calibration parameter from said at least one reference calibration parameter and said at least one test calibration parameter according to a fourth predetermined method.

10. The method of claim 6 wherein said first predetermined method comprises the step of determining a first transfer ratio of said first calibration signal to said first portion.

11. The method of claim 7 wherein said second predetermined method comprises the step of determining a second transfer ratio of said second calibration signal to said second portion.

12. The method of claim 5 wherein said third predetermined method comprises the step of determining a product of said second transfer ratio and said first transfer ratio.

13. The method of claim 8 wherein said first predetermined method comprises the step of determining a first transfer ratio of said first calibration signal to said first portion, said second predetermined method comprises the step of determining a second transfer ratio of said second calibration signal to said second portion, and said third predetermined method comprises the step of determining a product of said second transfer ratio and said first transfer ratio.

14. The method of claim 9 wherein said first predetermined method comprises the step of determining a first transfer ratio of said first calibration signal to said first portion, said second predetermined method comprises the step of determining a second transfer ratio of said second calibration signal to said second portion, and said third predetermined method comprises the step of determining a product of said second transfer ratio and said first transfer ratio.

15. The method of claim 9 wherein said fourth predetermined method comprises the step of determining a transfer ratio of said at least one reference calibration parameter and said at least one test calibration parameter.

16. The method of claim 14 wherein said fourth predetermined method comprises the step of determining a transfer ratio of said at least one reference calibration parameter and said at least one test calibration parameter.

* * * * *